Patented Oct. 6, 1953

2,654,716

UNITED STATES PATENT OFFICE 2,654,716

PLASTIC MOLDING POWDER AND THE MANUFACTURE THEREOF

Roy A. Sorenson, Fords, N. J., assignor to Nixon Nitration Works, Nixon, N. J., a corporation of New Jersey No Drawing. Application April 7, 1951, Serial No. 219,888

6 Claims. (Cl. 260—17)

This invention relates to a plastic molding powder and the manufacture thereof, and it particularly pertains to plastic molding powder comprised of vinylidene chloride or vinylidene resin polymers and cellulose acetate and the method of forming such plastic molding powder from cellulose acetate products coated with vinylidene chloride or vinylidene resin polymers.

Commercial movie and X-ray films and other such products are formed from cellulose acetate coated with vinylidene chloride or vinylidene resin polymers. A subordinate proportion of triphenyl phosphate is usually incorporated in the cellulose acetate which is the preponderate component. Heretofore, it has been commercially impractical to reclaim these used films or such coated products for plastic molding powder because of the expense and difficulty in removing the vinylidene coating material from the cellulose acetate base material, and all previous attempts of reclamation have involved the removal of the vinylidene coating material to free the cellulose acetate base material therefrom in order for said base material to be alone reclaimed into a molding powder. The coating material is acid and alkali resistant, and also resistant to temperatures as high as 275° F., thereby essentially differing in character and composition from the cellulose acetate which is extruded and molded at temperature ranges from 325° F., to 500° F. under these extruding and molding conditions, the vinylidene compounds of the coating material are not stable, and it is in this respect that the coating material differs from the cellulose acetate. The removal of the coating material heretofore has been by mechanical or chemical means, such as by soaking the coated film or product in hot water to soften the cellulose acetate to release the coating material or washing the coated film or product in a solvent for the coating material. No attempt has been made to reclaim the coated film stock by retaining the coating material and mixing it in the reclaimed cellulose acetate molding powder.

Accordingly, the principal object of my invention is a molding powder formed from cellulose acetate products coated with the vinylidene material without separating out or removing the coating material from the cellulose acetate.

Another object of the invention is to form a molding powder from cellulose acetate base stock coated with vinylidene material without degradation of the cellulose acetate and the vinylidene material.

Another object of the invention is to convert the coated cellulose acetate base stock to molding powder by retaining the coating and stabilizing it and the cellulose acetate while being converted.

Still another object of the invention is to provide an economical and simple commercial method for making a molding powder from the cellulose acetate base stock.

Still another object of the invention is in the reclamation of used products which heretofore have been waste.

Further objects, and objects relating to details of composition and economies of operation will readily appear from the detailed description to follow. In one instance, I have accomplished the objects of my invention by the composition and method set forth in the following specification. My invention is clearly defined and pointed out in the appended claims. A composition and method constituting the preferred embodiment of my invention are set forth in the following specification.

The invention generally described comprises cellulose acetate products, such as movie and X-ray films containing a substantial but subordinate proportion of triphenyl phosphate, and coated with vinylidene chloride or vinylidene resin polymer, especially the coating material known and sold in the trade under the name of "Saran." "Saran" is a vinylidene chloride plastic sold by the Firestone Rubber and Latex Products Company. It is derived from ethylene and chlorine polymerized to produce a tough thermoplastic resistant to water and chemicals, and is sometimes also referred to as polyvinylidene chloride. See page 655 of Materials Handbook (4th ed.) of George S. Grady, published by McGraw-Hill Book Company, Inc., New York and London, and pages 804, 1050, 1051, 1056, 1058 and 1194, Modern Plastics Encyclopedia and Engineers' Handbook (1950 edition), published by Plastics Catalog Corporation, 122 East 42nd Street, New York, New York. Commercial movie and X-ray films are composed of about 88% cellulose acetate and 12% triphenyl phosphate, and they are coated with a film layer of the "Saran" material which covers and protects the base material.

This coated film stock is reclaimed into plastic molding powder without separating out and removing the "Saran" coating material by mixing the film stock with a stabilizer and a plasticizer for said cellulose acetate and the coating material. The coated film stock, the stabilizer and the plasticizer are compounded to and formed into plastic molding powder under heat and pressure by conventional methods of making plastic molding powder. The stabilizer is any material which is compatible with the cellulose acetate base and the coating material and combines with acids, such as hydrogen chloride and acetic acid, that are freed in compounding the coated base materials, thereby preventing catalytic action resulting in the mixture from the freed acids.

The stabilizing means are represented by tin compounds such as dibutyl tin laurate, dibutyl tin maleate, dibutyl tin dilaurate, and the like or a combination of them. It has been found that with the use of tin compounds both the cellulose acetate and the coating material can be stabilized and the tin compounds will also be compatible therewith. While other metal compounds exhibit some of the properties of the tin compounds, they do not provide for both stabilization and compatibility as do the tin compounds. Stabilization of one of the components of the coated stock or compatibility therewith of the stabilizer is not alone sufficient. Both are essential. If a sufficient quantity of these other metal compounds be used to give the desired degree of stabilization, the range for their compatibility with the cellulose acetate and "Saran" mixture is exceeded. Therefore, the feature of the stabilizer is its character or ability to be compatible with and be a stabilizer of the cellulose acetate and coating material, and any compound which so functions would be suitable whether it were a tin compound or not. The tin compounds, and those specifically referred to, are representative of the stabilizers which are of the character or have the ability to be compatible with the cellulose acetate and "Saran" mixture which they stabilize. Thus, this component may be generally referred to as a compatible stabilizer to distinguish from such compounds which might be a stabilizer but would not be compatible with the cellulose acetate and "Saran" mixture or was compatible with said cellulose acetate and "Saran" mixture but not a stabilizer therefor.

While the organic tin compounds can be used in any proportion, they preferably comprise from one (1) to eight (8) pounds for each one hundred (100) pounds of the coated base material.

A plasticizer, or a combination of plasticizers, is added to the coated base stock in addition to the compatible stabilizer, and the plasticizer must be compatible with the cellulose acetate and have some solvent action on the "Saran" coating in order that it can penetrate said coating into the cellulose acetate core or base, thereby imparting a uniform lower softening temperature for the composition to provide for good extrusion without screen plugging that would result from any non-uniformity of flow. Without the proper selection of plasticizers, they do not get intermingled with all the cellulose acetate because of their inability to soften the "Saran" coating material. It has been found that the use of two plasticizers give very good results, these being an alkyl phthalate, particularly diethyl phthalate and dimethyl phthalate, and ortho nitro diphenyl, with or without the use of other conventional cellulose acetate plasticizers. These are referred to as special plasticizers to distinguish from the conventional plasticizers. These two special plasticizers may be used alone or together with any other conventional cellulose acetate plasticizers, such as triphenyl phosphate and triethyl citrate, triacetin, and the like. Where the special ones are used with conventional plasticizers, the special plasticizers should comprise at least 10%, and preferably about 50%, by weight, the two special plasticizers being in about equal proportions, by weight, or with the ortho nitro diphenyl plasticizer slightly exceeding the amount of the phthalate type plasticizer.

The converted "Saran" coated base cellulose acetate stock can be used alone for making plastic molding powder or it can be mixed in any proportion with flake stock that is conventionally used for making the molding powder. The conventional formula for cellulose acetate molding powder is 70% cellulose acetate flake and 30% plasticizer.

It will be understood that conventional pigments may be included in the reclaimed composition the same as if the molding powder were made from flake stock alone as heretofore.

There is given below a typical formula for making cellulose acetate molding powder entirely from cellulose acetate base material coated with a film of "Saran" material:

76 pounds "Saran" coated cellulose acetate.
14 pounds ortho nitro diphenyl.
10 pounds dimethyl phthalate.
2 pounds dibutyl tin laurate.
100 grams titanium oxide.
500 grams calco red NL.
50 grams chrome yellow.

One typical formula in which the "Saran" coated base is mixed with cellulose acetate flake is as follows:

50 pounds "Saran" coated cellulose acetate.
25 pounds cellulose acetate flake.
20 pounds ortho nitro diphenyl.
5 pounds diethyl phthalate.
1 pound dibutyl tin maleate.
1000 grams ultramarine blue.
100 grams argyl blue.
100 grams titanium oxide.

It will be understood however, that these particular formulas are only illustrative and that the cellulose acetate flake can be combined with any proportion of the converted "Saran" coated cellulose acetate base material as herein disclosed. The special plasticizers have been given in both formulas, but these may be replaced in part with any conventional plasticizer or plasticizers in accordance with the proportion above given for the special plasticizers in respect to the conventional ones.

I am aware that there may be various changes in details of methods or steps without departing from the spirit of my invention, and therefore I claim my invention broadly as indicated by the appended claims.

Having thus described my invention, what I claim as new and useful and desire to secure by United States Letters Patent, is:

1. Plastic molding powder formed from vinylidene chloride resin polymer coated cellulose acetate products which have been compounded into a mixed mass with a stabilizer that is compatible with said cellulose acetate and vinylidene chloride resin polymer and a plasticizer that is compatible with said cellulose acetate and is solvent for the said vinylidene chloride resin polymer.

2. Plastic molding product comprising vinylidene chloride resin polymer and cellulose acetate reclaimed from cellulose products coated with vinylidene chloride resin polymer which have been compounded into a plastic mass with a plasticizer therefor and a compatible stabilizer.

3. A method for making plastic molding products from vinylidene chloride resin polymer coated cellulose acetate products comprising mixing a compatible organic metallic stabilizer and plasticizer with the coated products, said plasticizer comprising one which is compatible with the cellulose acetate and is a solvent for the vinylidene chloride resin polymer.

4. The method set forth in claim 3 in which the compatible stabilizer is an organic tin compound.

5. The method of claim 4 in which the organic tin compound is selected from the group consisting of dibutyl tin maleate, dibutyl tin laurate, and dibutyl tin dilaurate.

6. The method of claim 3 in which the plasticizer comprises alkyl phthalate and ortho nitro diphenyl.

ROY A. SORENSON.

References Cited in the file of this patent

UNITED STATES PATENTS

| Number | Name | Date |
|---|---|---|
| 2,201,908 | McBurney | May 21, 1940 |
| 2,292,393 | Mitchell | Aug. 11, 1942 |
| 2,307,092 | Yngve | Jan. 5, 1943 |